US012762445B2

(12) United States Patent
Singh

(10) Patent No.: US 12,762,445 B2
(45) Date of Patent: Oct. 13, 2026

(54) SYSTEM AND METHOD FOR DYNAMICALLY ANALYZING AND CONFIGURING NODES OF A DISTRIBUTED NETWORK LEVERAGING PHOTONIC QUANTUM COMPUTING

(71) Applicant: BANK OF AMERICA CORPORATION, Charlotte, NC (US)

(72) Inventor: Shailendra Singh, Thane West (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 770 days.

(21) Appl. No.: 18/126,555

(22) Filed: Mar. 27, 2023

(65) Prior Publication Data

US 2024/0330727 A1 Oct. 3, 2024

(51) Int. Cl.
*G06N 10/20* (2022.01)

(52) U.S. Cl.
CPC .................................... *G06N 10/20* (2022.01)

(58) Field of Classification Search
CPC ........... G06N 10/20; G06N 3/08; G06N 10/00
See application file for complete search history.

(56) References Cited

U.S. PATENT DOCUMENTS 10,498,808 B2 12/2019 Purushothaman et al.
10,693,646 B2 6/2020 Kurian
10,839,386 B2 11/2020 Kamalsky et al.
10,944,745 B2 3/2021 Kursun et al.
10,949,511 B2 3/2021 Frederick et al.
11,128,442 B1 9/2021 Deshpande et al.
11,165,754 B2 11/2021 Pattanaik et al.
11,165,787 B2 11/2021 Sloane et al.
11,296,882 B1 4/2022 Singh et al.
2020/0394276 A1* 12/2020 Woerner ................ G06N 5/045
2021/0073913 A1 3/2021 Ingargiola
(Continued)

OTHER PUBLICATIONS

Friman J, Ek M, Chen P, Manocha J, Soares J. Service exposure: a critical capability in a 5G world. Ericsson Technology Review. May 2019;2:18-27. (Year: 2019).*
(Continued)

*Primary Examiner* — Kc Chen
(74) *Attorney, Agent, or Firm* — Moore & Van Allen PLLC; Nicholas C. Russell

(57) ABSTRACT

A system for dynamically analyzing and configuring nodes of a distributed network leveraging photonic quantum computing is provided. In particular, the system may be configured for identifying one or more nodes of a distributed register network, extracting metadata from the one or more nodes, monitoring the one or more nodes to detect changes to the one or more nodes, determining, via a deep learning network, anomalies associated with the one or more nodes based on the changes, determining target metrics and factors associated with the anomalies, creating simulation test scenarios based on the target metrics, factors, and anomalies, wherein the simulation test scenarios are associated with a plurality of configurations of the one or more nodes, executing the simulation test scenarios in parallel, via a quantum computer, and determining an optimal configuration for the one or more nodes from the plurality of configurations based on executing the simulation test scenarios.

20 Claims, 9 Drawing Sheets

(56) References Cited

U.S. PATENT DOCUMENTS

| | | | | |
|---|---|---|---|---|
| 2021/0385233 | A1* | 12/2021 | Chopra | G06N 3/0495 |
| 2022/0012731 | A1 | 1/2022 | Derosa-Grund | |
| 2022/0038259 | A1 | 2/2022 | Fazzone et al. | |
| 2022/0069976 | A1* | 3/2022 | Yellick | H04L 41/0873 |
| 2023/0042890 | A1* | 2/2023 | Wen | G06F 9/5083 |

OTHER PUBLICATIONS

Jia F, Li X, Qiao D, Zhou X. Semi-analytical configuration optimization of geocentric gravitational wave observatory. Acta Astronautica. Jan. 1, 2023;202:522-34. (Year: 2023).*

Faiçal BS, Marcondes CA, Loubach DS, Sbruzzi EF, Verri FA, Marques JC, Pereira LA, Maximo MR, Curtis VV. A Cyber-Physical System's Roadmap to Last-Mile Delivery Drones. IEEE Aerospace and Electronic Systems Magazine. Jan. 26, 2023;38(5):6-16. ( Year: 2023).*

* cited by examiner

700

| NODE ID 705 | NODE TYPE 710 | ANOMALY 715 | FACTORS 720 | TARGET METRICS 725 | FACTOR LEVELS 730 |
|---|---|---|---|---|---|
| NODE 001 | FULL NODE | CHANGE IN HARDWARE | PERFORMANCE DELAY IN VOTING | TRANSACTION VOLUME | <10000 PER MS<br>>=10000 PER MS |
| NODE 002 | PRUNED FULL NODE | CHANGE IN HARDWARE | DATA HOLD | TIME TO HOLD DATA | 0-30 SEC<br>31-60 SEC |
| NODE 003 | AUTHORITY NODE | SOFTWARE CONFIGURATION MISMATCH | AUTHORIZING OTHER NODES | TRANSACTION VOLUME | <10000 PER MS<br>>=10000 PER MS |
| NODE 004 | MINING NODE | CHANGE IN HARDWARE | PERFORMANCE DELAY IN VOTING | TRANSACTION VOLUME | <10000 PER MS<br>>=10000 PER MS |
| NODE 005 | MASTER NODE | SOFTWARE CONFIGURATION MISMATCH | LATENCY IN VALIDATING TRANSACTION | TRANSACTION VOLUME | <10000 PER MS<br>>=10000 PER MS |
| NODE 006 | - | - | - | - | - |
| NODE 007 | - | - | - | - | - |

FIG. 7

800

| FACTOR 1 805 | FACTOR 2 810 | FACTOR 3 815 | FACTOR 4 820 | EXPOSURE RATING 825 | CONFIGURATION 830 | STABILITY RATING 835 |
|---|---|---|---|---|---|---|
| 0 | 0 | 0 | 0 | 10 | 1 | UNSTABLE |
| 0 | 0 | 0 | 1 | 4 | 2 | STABLE |
| 0 | 0 | 1 | 0 | 10 | 3 | UNSTABLE |
| 0 | 0 | 1 | 1 | 6 | 4 | WEAK STABLE |
| 0 | 1 | 0 | 0 | 7 | 5 | WEAK STABLE |
| 0 | 1 | 0 | 1 | 9 | 6 | UNSTABLE |
| 0 | 1 | 1 | 0 | 8 | 7 | UNSTABLE |
| 0 | 1 | 1 | 1 | 10 | 8 | UNSTABLE |
| 1 | 0 | 0 | 0 | 2 | 9 | STABLE |
| 1 | 0 | 0 | 1 | 9 | 10 | UNSTABLE |
| 1 | 0 | 1 | 0 | 9 | 11 | UNSTABLE |
| 1 | 0 | 1 | 1 | 10 | 12 | UNSTABLE |
| 1 | 1 | 0 | 0 | 10 | 13 | UNSTABLE |
| 1 | 1 | 0 | 1 | 8 | 14 | UNSTABLE |
| 1 | 1 | 1 | 0 | 1 | 15 | STABLE |
| 1 | 1 | 1 | 1 | 9 | 16 | UNSTABLE |

FIG. 8

SYSTEM AND METHOD FOR DYNAMICALLY ANALYZING AND CONFIGURING NODES OF A DISTRIBUTED NETWORK LEVERAGING PHOTONIC QUANTUM COMPUTING

BACKGROUND

There is a need for dynamically analyzing and configuring nodes of a distributed network.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for dynamically analyzing and configuring nodes of a distributed network. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies one or more nodes of a distributed register network, extracts metadata from the one or more nodes, continuously monitors the one or more nodes to detect changes to the one or more nodes, parses the metadata and the changes to a deep learning network, determines, via the deep learning network, anomalies associated with the one or more nodes based on the changes, determines target metrics and factors associated with the anomalies, creates simulation test scenarios based on the target metrics, factors, and the anomalies, wherein the simulation test scenarios are associated with a plurality of configurations of the one or more nodes, executes the simulation test scenarios in parallel, via a quantum computer, and determines an optimal configuration for the one or more nodes from the plurality of configurations based on executing the simulation test scenarios.

In some embodiments, the present invention routes the optimal configuration to the distributed register network and deploys the optimal configuration to the one or more nodes of the distributed register network.

In some embodiments, the present invention determines the optimal configuration based at least on determining an exposure rating associated with the plurality of configurations.

In some embodiments, the present invention determines the optimal configuration based at least on determining a stability rating associated with the plurality of configurations.

In some embodiments, the present invention determines type of the one or more nodes based on the metadata extracted from the one or more nodes.

In some embodiments, the present invention controls the one or more nodes based on at least one of geo fencing and temporal fencing.

In some embodiments, the quantum computer is a photonic quantum computer.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
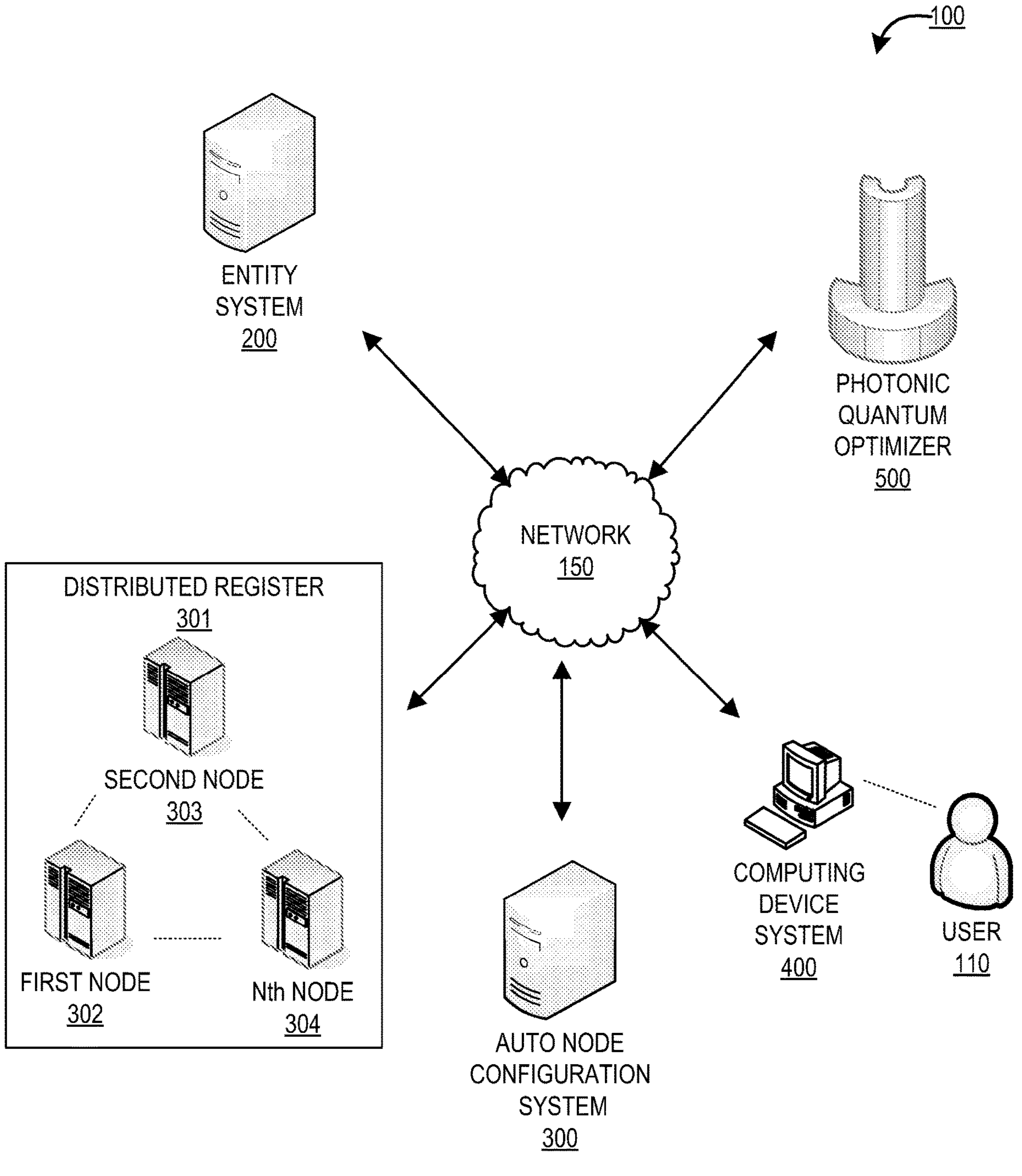
Figure 2:
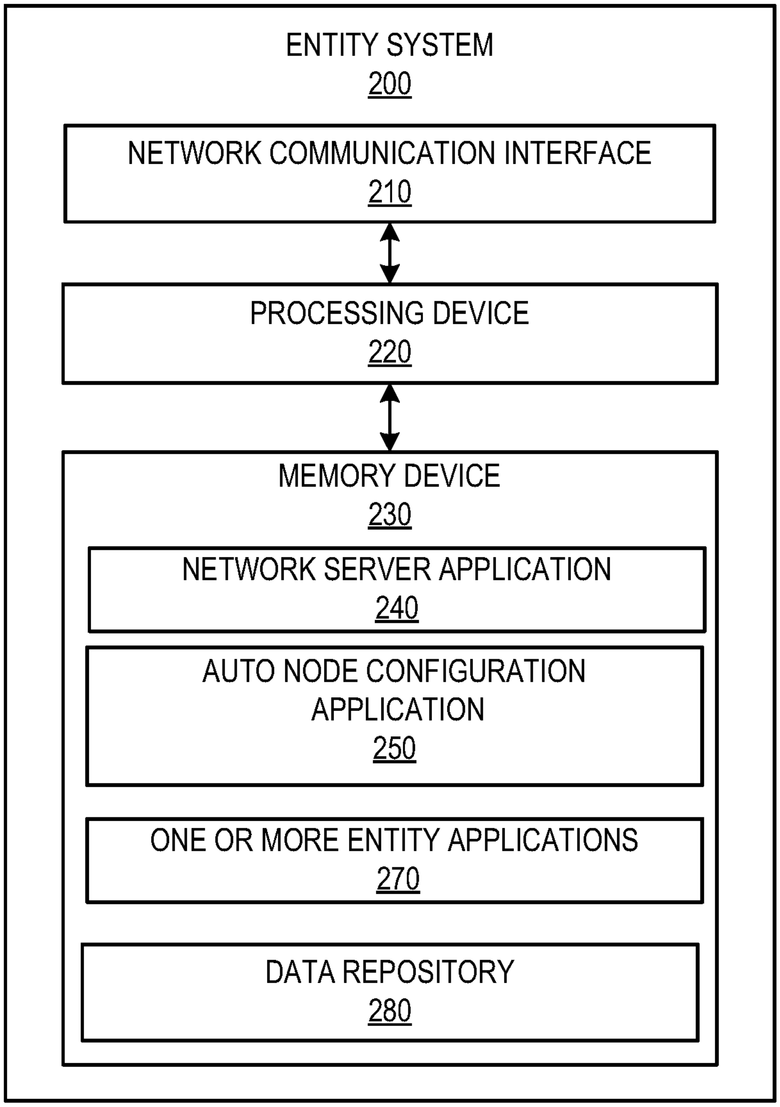
Figure 3:
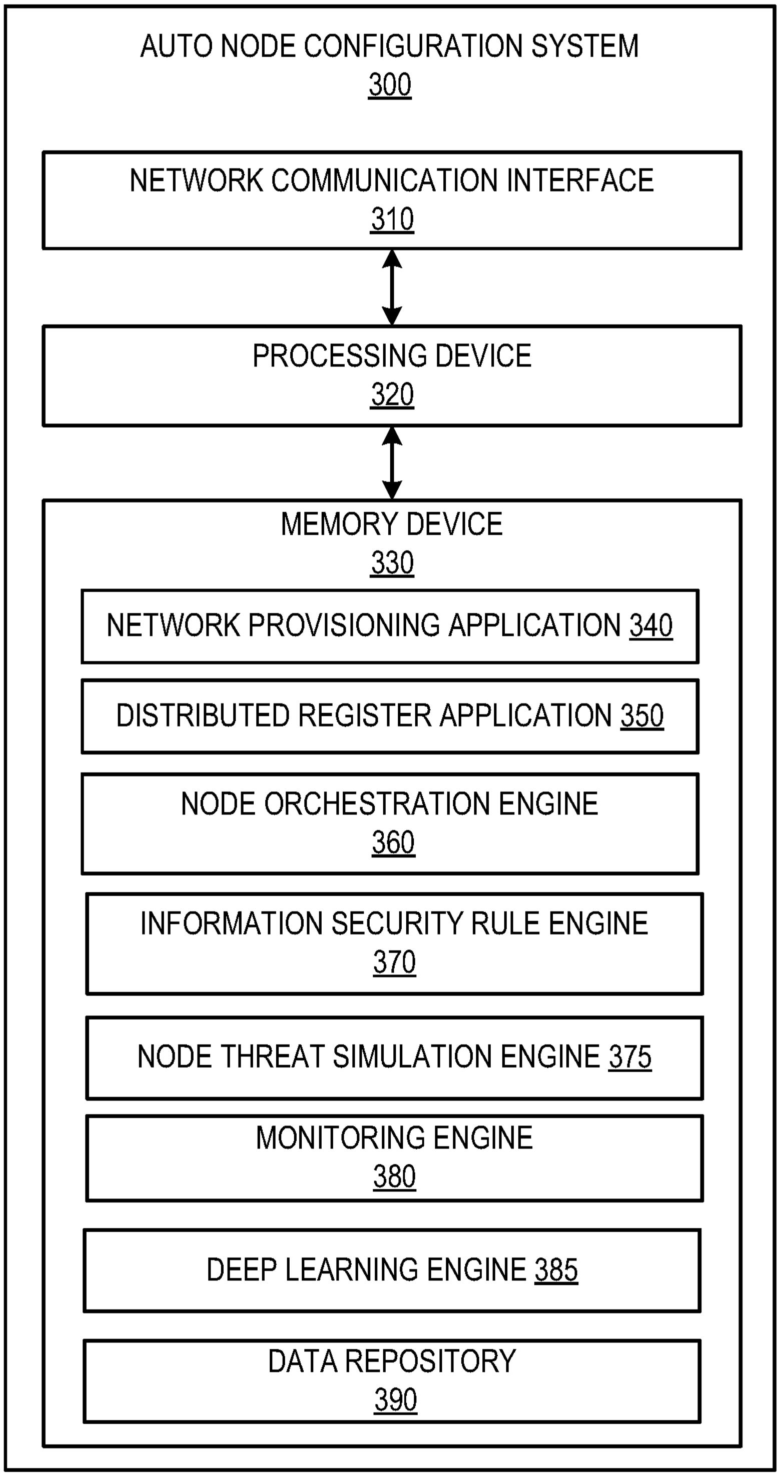
Figure 4:
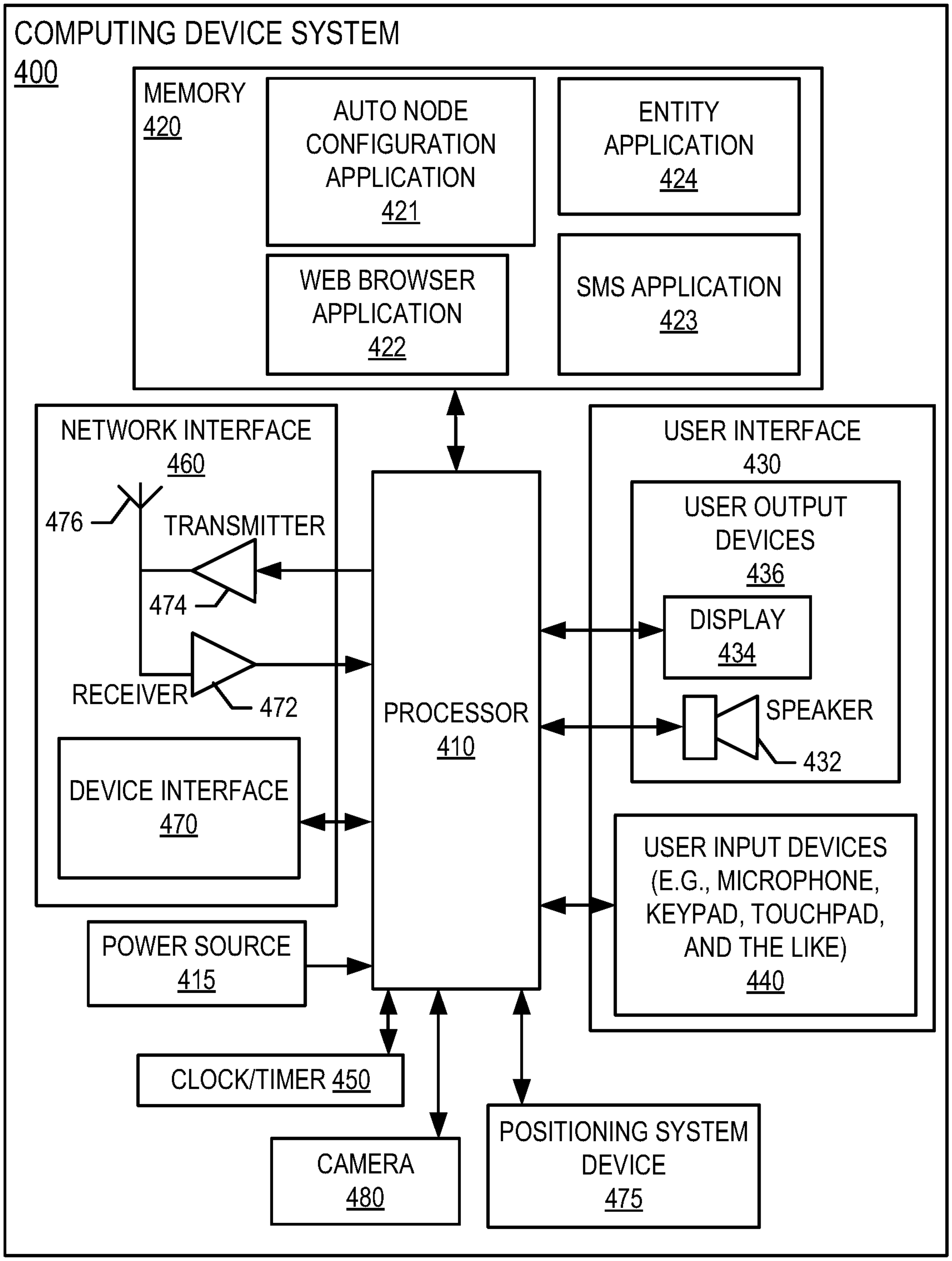
Figure 5:
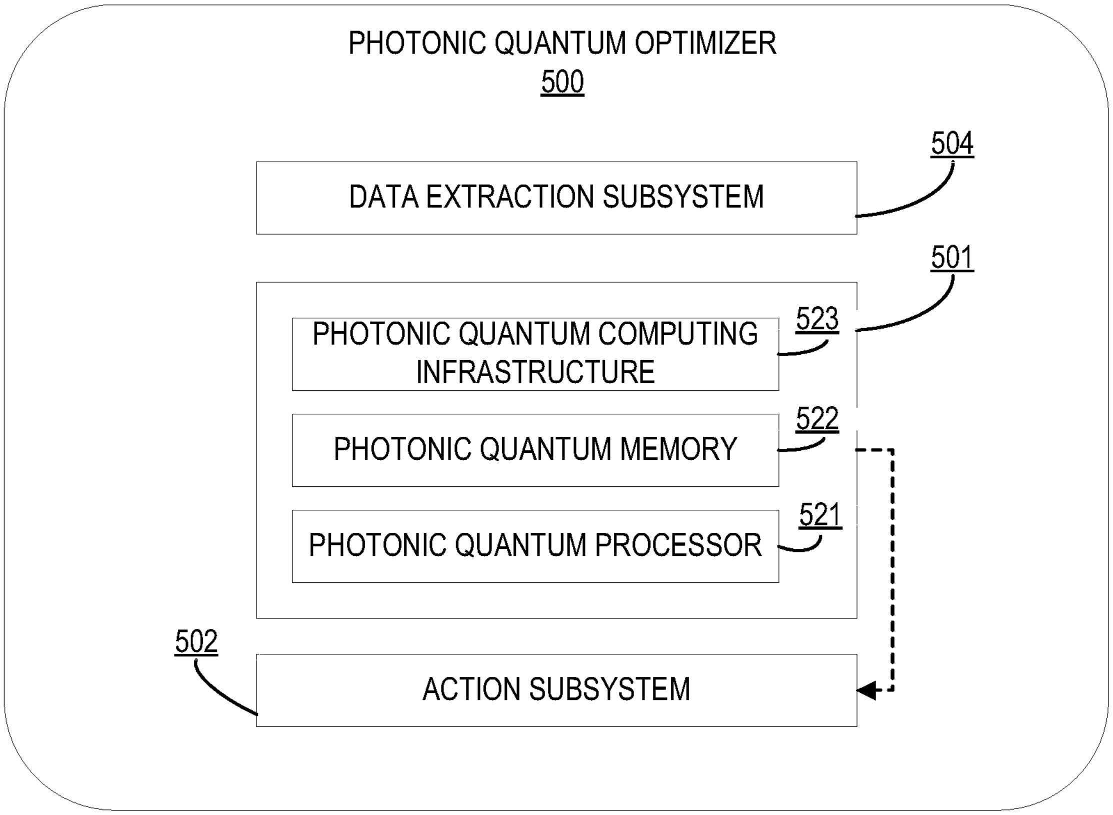
Figure 6A:
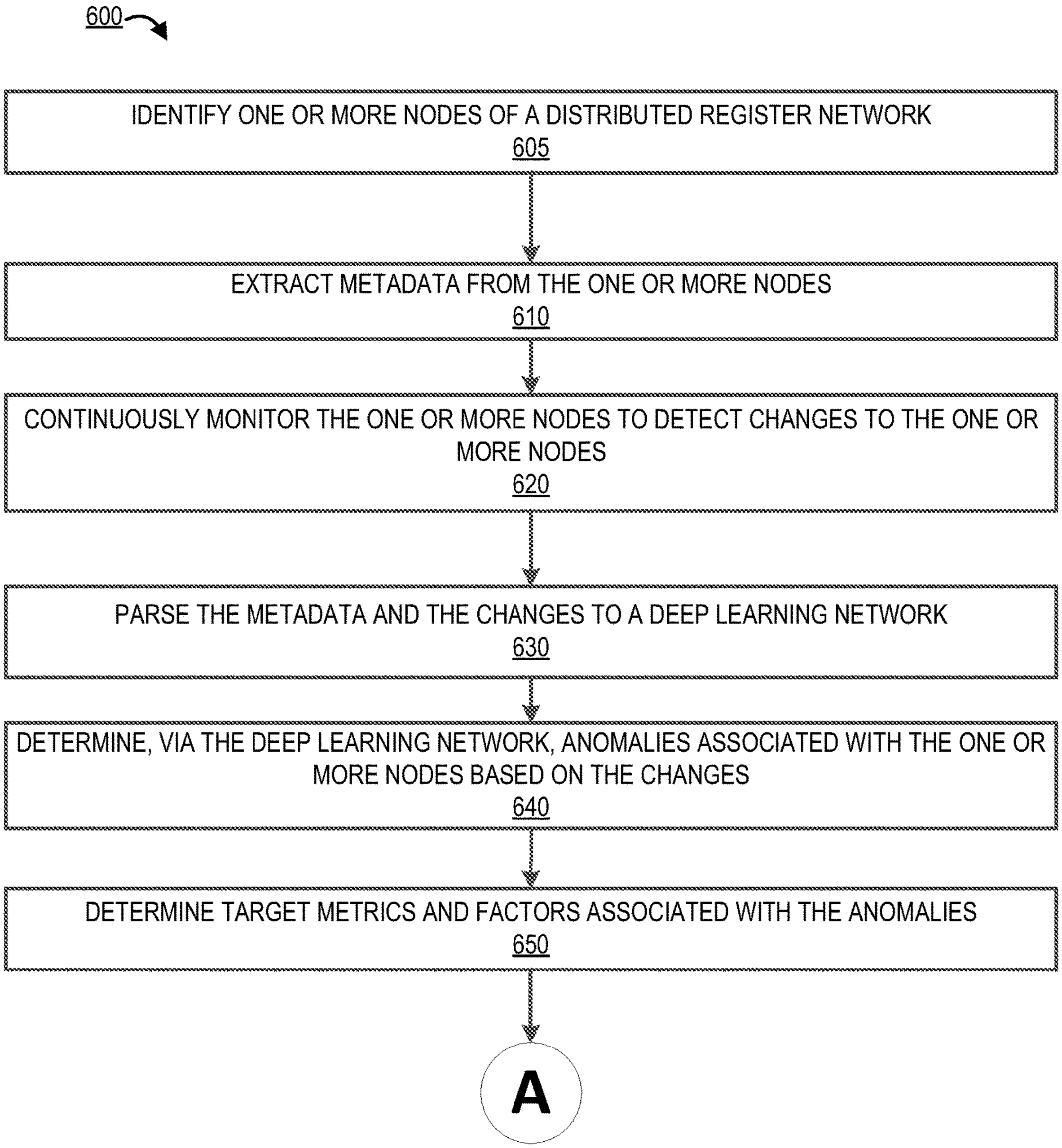
Figure 6B:
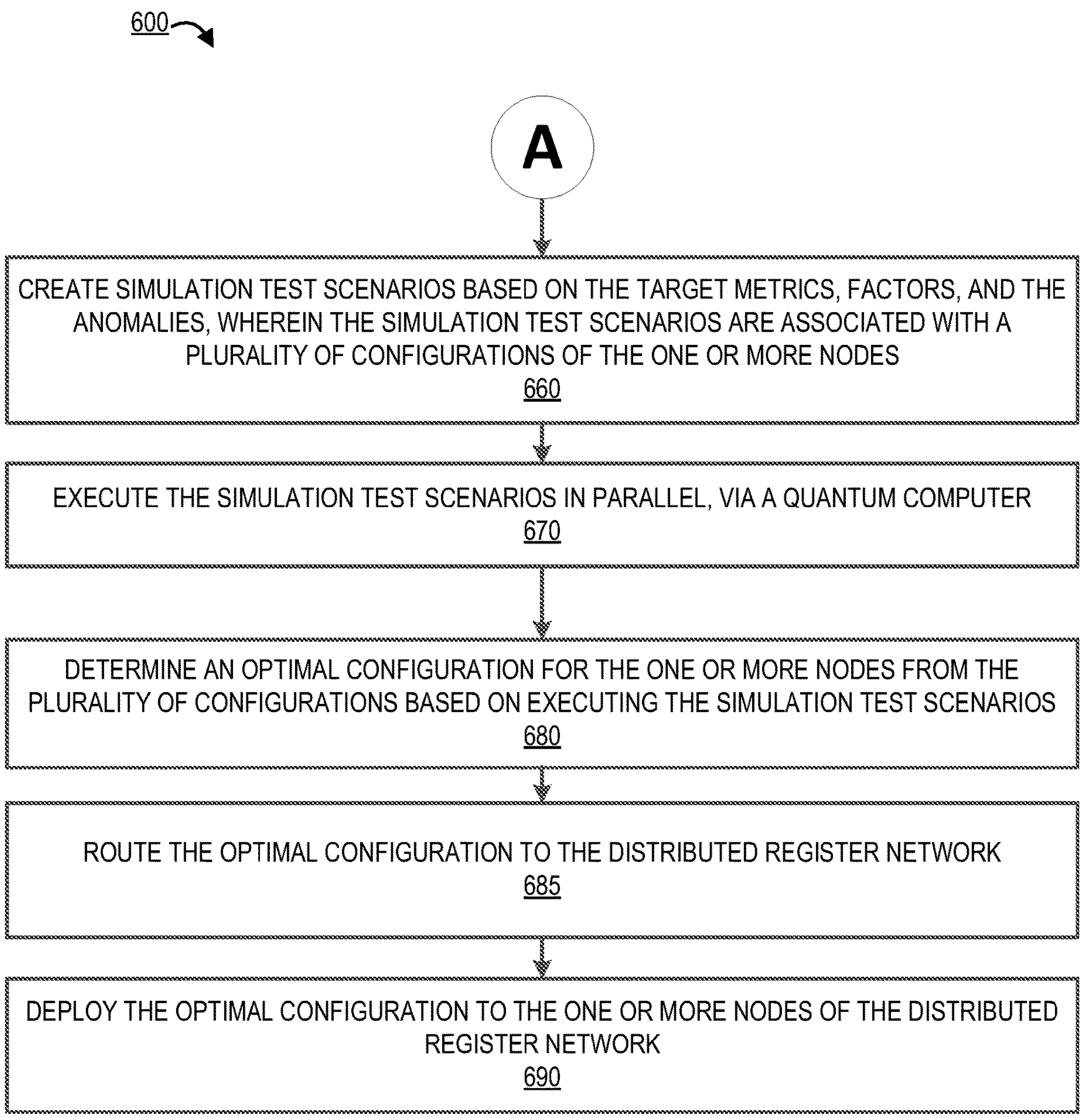

Having thus described embodiments of the invention in general terms, reference will now be made the accompanying drawings, wherein:

FIG. 1 provides a block diagram illustrating a system environment for auto-segmentation of digital resources for facilitating resource processing events in a virtual ecosystem, in accordance with an embodiment of the invention;

FIG. 2 provides a block diagram illustrating the entity system 200 of FIG. 1, in accordance with an embodiment of the invention;

FIG. 3 provides a block diagram illustrating a auto node configuration system 300 of FIG. 1, in accordance with an embodiment of the invention;

FIG. 4 provides a block diagram illustrating the computing device system 400 of FIG. 1, in accordance with an embodiment of the invention;

FIG. 5 presents a block diagram illustrating the quantum optimizer 500 of FIG. 1, in accordance with embodiments of the present invention;

FIGS. 6A and 6B provide a process flow for auto-segmentation of digital resources for facilitating resource processing events in a virtual ecosystem, in accordance with an embodiment of the invention;

FIG. 7 provides a tabular representation of determining anomalies, factors, and metrics associated with one or more nodes of a distributed register network, in accordance with an embodiment of the invention; and FIG. 8 provides a tabular representation of one or more configurations associated with the one or more nodes of the distributed register network, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Distributed register," which may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," "linked structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, a pointer (e.g., a hash value) to the previous block in the linked block structure, and/or any additional data created by the system of the present invention. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified. In some embodiments of the present invention, a user may submit data associated with the creation of a new block associated with the linked block structure. For example, a user may initiate a transaction, where the data associated with the transaction is stored in a new block linked with the transaction.

A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

"Permissioned distributed ledger" as used herein may refer to a linked block ledger for which an access control mechanism is implemented such that only known, authorized users may take certain actions with respect to the linked block ledger (e.g., add new data records, participate in the consensus mechanism, or the like). Accordingly, "unpermissioned distributed ledger" as used herein may refer to a linked block ledger without an access control mechanism.

"Private distributed ledger" as used herein may refer to a linked block ledger accessible only to users or devices that meet specific criteria (e.g., authorized users or devices of a certain entity or other organization). Accordingly, a "public distributed ledger" is a linked block ledger accessible by any member or device in the public realm. In some embodiments of the present invention, the distributed ledger being described herein may be a permissioned distributed ledger. In some embodiments of the present invention, the distributed ledger being described herein may be a private distributed ledger.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid distributed ledger such that certain nodes may store certain segments of the linked block ledger but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

As used herein, a quantum computer is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing.

Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to $2^n$ states simultaneously. By comparison, a classical computer can only be in one of the $2^n$ states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present invention make use of quantum ability of optimization by utilizing a quantum computer in conjunction with a classical computer. Such a configuration enables the present invention to take advantage of quantum speedup in solving optimization problems, while avoiding the drawbacks and difficulty of implementing quantum computing to perform non-optimization calculations. Examples of quantum computers that can be used to solve optimization problems parallel to a classic system are described in, for example, U.S. Pat. Nos. 9,400,499, 9,207,672, each of which is incorporated herein by reference in its entirety.

In preferred embodiments of the present invention, photonic quantum computers are used, where photons are used to represent qubits as quantum states of light are durable. Photons do not interact with each often and hence uncontrolled interactions are avoided that destroy their quantum state. The photonic quantum computer 500 described herein manipulates photons using linear materials based on requirements of this invention.

Distributed registers are being used for different types of applications by various organizations. However, distributed register infrastructures may face security threats such as software misconfigurations, Denial-of-Service attacks, malicious data, malware, and/or the like, thereby making the distributed register infrastructure less robust and reliable. Currently, a plurality of distributed register networks interact with each other to transfer transactions and in such a scenario when one of the distributed register is compromised, the other distributed register networks also become unstable. Additionally, certain nodes of distributed registers may be more suitable for processing certain transactions of the distributed register, but may be configured to process different kind of transactions, thereby reducing the overall efficiency of the node and the distributed register. As such, there exists a need for system that can overcome these technical problems and vulnerabilities and configure nodes dynamically to improve the overall efficiency, reliability, and security of the nodes and the distributed register.

FIG. 1 provides a block diagram illustrating a system environment 100 for auto-segmentation of digital resources for facilitating resource processing events in a virtual ecosystem, in accordance with an embodiment of the invention. As illustrated in FIG. 1, the environment 100 includes an auto node configuration system 300, an entity system 200, a computing device system 400, a distributed register 301, and a photonic quantum optimizer 500. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200. In some embodiments, the one or more users 110 may be potential customers of the entity associated with the entity system 200. In some embodiments, the one or more users 110 may be employees of the entity.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity system 200 may be any organization that leverages distributed register for performing one or more organization activities.

The auto node configuration system 300 is a system of the present invention for performing one or more process steps described herein. In some embodiments, the auto node configuration system 300 may be an independent system. In some embodiments, the auto node configuration system 300 may be a part of the entity system 200. In some embodiments, the auto node configuration system 300 may be controlled, owned, managed, and/or maintained by the entity associated with the entity system 200.

In some embodiments, the distributed register 301 comprises one or more nodes (e.g., first node 302, second node 303, through nth node). In some embodiments, the distributed register 301 may be a private distributed register associated with the entity. In some embodiments, the distributed register 301 may be a public distributed register. In some embodiments, one or more of the auto node configuration system 300, the entity system 200, the photonic quantum optimizer 500, and the computing device system 400 may be one or more nodes of the distributed register 301.

The auto node configuration system 300, the entity system 200, the computing device system 400, the distributed register 301, and the photonic quantum optimizer 500 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the auto node configuration system 300 is configured to communicate information or instructions with the entity system 200, the computing device system 400, the virtual environment system 201, the distributed register 301, and the photonic quantum optimizer 500 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the auto node configuration system 300, the entity system 200, the virtual environment system 201, the distributed register 301, and/or the photonic quantum optimizer 500 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution or a non-financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an auto node configuration application 250, one or more entity applications 270, and a data repository 280. The one or more entity applications 270 may be any applications developed, supported, maintained, utilized, and/or controlled by the entity. The computer-executable program code of the network server application 240, the auto node configuration application 250, the one or more entity application 270 to perform certain logic, data-extraction, and data-storing functions of the entity system 200 described herein, as well as communication functions of the entity system 200.

The network server application 240, the auto node configuration application 250, and the one or more entity applications 270 are configured to store data in the data repository 280 or to use the data stored in the data repository 280 when communicating through the network communication interface 210 with the auto node configuration system 300, and/or the computing device system 400 to perform one or more process steps described herein. In some embodiments, the entity system 200 may receive instructions from the auto node configuration system 300 via the auto node configuration application 250 to perform certain operations. The auto node configuration application 250 may be provided by the auto node configuration system 300. The one or more entity applications 270 may be any of the applications used, created, modified, facilitated, developed, and/or managed by the entity system 200.

FIG. 3 provides a block diagram illustrating the auto node configuration system 300 in greater detail, in accordance with embodiments of the invention. As illustrated in FIG. 3, in one embodiment of the invention, the auto node configuration system 300 includes one or more processing devices 320 operatively coupled to a network communication interface 310 and a memory device 330. In certain embodiments, the auto node configuration system 300 is operated by an entity, such as a financial institution. In other embodiments, the auto node configuration system 300 is operated by a non-financial institution. In some embodiments, the auto node configuration system 300 is owned or operated by the entity of the entity system 200. In some embodiments, the auto node configuration system 300 may be an independent system. In alternate embodiments, the auto node configuration system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the auto node configuration system 300 described herein. For example, in one embodiment of the auto node configuration system 300, the memory device 330 includes, but is not limited to, a network provisioning application 340, a distributed register application 350, a node orchestration engine 360, information security rule engine 370, a node threat simulation engine 375, a monitoring engine, a deep learning engine 385, and a data repository 390 comprising any data processed or accessed by one or more applications in the memory device 330. The computer-executable program code of the network provisioning application 340, the distributed register application 350, the node orchestration engine 360, the information security rule engine 370, the node threat simulation engine 375, the monitoring engine, and the deep learning engine 385 may instruct the processing device 320 to perform certain logic, data-processing, and data-storing functions of the auto node configuration system 300 described herein, as well as communication functions of the auto node configuration system 300.

The network provisioning application 340, the distributed register application 350, the node orchestration engine 360, the information security rule engine 370, the node threat simulation engine 375, the monitoring engine, and the deep learning engine 385 are configured to invoke or use the data in the data repository 390 when communicating through the network communication interface 310 with the entity system 200, and/or the computing device system 400. In some embodiments, the network provisioning application 340, the distributed register application 350, the node orchestration engine 360, the information security rule engine 370, the node threat simulation engine 375, the monitoring engine, and the deep learning engine 385 may store the data extracted or received from the entity system 200, and the computing device system 400 in the data repository 390. In some embodiments, the network provisioning application 340, the distributed register application 350, the node orchestration engine 360, the information security rule engine 370, the node threat simulation engine 375, the monitoring engine, and the deep learning engine 385 may be a part of a single application (e.g., modules).

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an auto node configuration application 421, entity application 424. These applications also typically instructions to a graphical user interface (GUI) on the display 430 that allows the user 110 to interact with the entity system 200, the auto node configuration system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the auto node configuration application 421 provided by the auto node configuration system 300 allows the user 110 to access the auto node configuration system 300. In some embodiments, the entity application 424 provided by the entity system 200 and the auto node configuration application 421 allow the user 110 to access the functionalities provided by the auto node configuration system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 is a schematic diagram of an exemplary Photonic Quantum Optimizer 500 that can be used in parallel with a classical computer to solve optimization problems. The Quantum Optimizer 500 is comprised of a Data Extraction Subsystem 504, a Quantum Computing Subsystem 501, and an Action Subsystem 505. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 5, the Data Extraction Subsystem 504 communicates with the system of the invention to extract data for optimization. It will be understood that any method of communication between the Data Extraction Subsystem 504 and the network includes, but is not limited to wired communication, Radiofrequency (RF) communication, Bluetooth®, WiFi, and the like. The Data Extraction Subsystem 504 then formats the data for optimization in the Quantum Computing Subsystem.

As further depicted in FIG. 5, the Quantum Computing Subsystem 501 comprises a Photonic Quantum Computing Infrastructure 523, a Photonic Quantum Memory 522, and a Photonic Quantum Processor 521. The Photonic Quantum Computing Infrastructure 523 comprises physical components for housing the Photonic Quantum Processor 521 and the Photonic Quantum Memory 522. The Photonic Quantum Computing Infrastructure 523 further comprises a cryogenic refrigeration system to keep the Photonic Quantum Computing Subsystem 501 at the desired operating conditions. In general, the Photonic Quantum Processor 521 is designed to perform adiabatic quantum computation and/or quantum annealing to optimize data received from the Data Extraction Subsystem 504. The Photonic Quantum Memory 522 is comprised of a plurality of qubits used for storing data during operation of the Quantum Computing Subsystem 501. In general, qubits are any two-state quantum mechanical system. It will be understood that the Photonic Quantum Memory 522 may be comprised of any such two-state quantum mechanical system, such as the polarization of a single photon, the spin of an electron, and the like. In embodiments of the present invention, photons are used to represent qubits as quantum states of light are durable. Photons do not interact with each often and hence uncontrolled interactions are avoided that destroy their quantum state. The photonic quantum computer 500 described herein manipulates photons using linear materials based on requirements of this invention.

The Action Subsystem 502 communicates the optimized data from the Quantum Computing Subsystem 501 back to the system of the invention. It will be understood that any method of communication between the Data Extraction Subsystem 504 and the network includes, but is not limited to wired communication, Radiofrequency (RF) communication, Bluetooth®, WiFi, and the like.

In accordance with the present systems and methods, an on-board quantum optimizer may be employed to perform real-time optimizations to hyper parameters of machine learning models more quickly and more reliably than a digital computing system. Because a quantum computing device inherently performs optimization in its natural evolution, quantum optimizer is particularly well-suited to solve optimization problems.

FIGS. 6A and 6B provide a flowchart 600 illustrating a process flow for auto-segmentation of digital resources for facilitating resource processing events in a virtual ecosystem, in accordance with an embodiment of the invention. As shown in block 605, the system identifies one or more nodes of a distributed register network. One or more nodes of the distributed register network may be any system or a device that possesses an Internet Protocol (IP) address. The one or more nodes may be any type of nodes, where types of nodes may comprise full node, a pruned full node, an archival full node, an authority node, mining nodes, major nodes, staking nodes, light nodes, and super nodes. Full nodes of the distributed register network may be responsible for storing records of transactions carried out in the distributed register network based on using consensus models. Pruned full nodes of the distributed register network may be responsible for storing data or blocks on a memory device by pruning older blocks. Archival full nodes of the distributed register network may be responsible for storing and maintaining database of the entire distributed register network. Authority nodes of the distributed register network may be responsible for controlling and restricting access of all other nodes of the distributed register network. Miner nodes of the distributed register network may be responsible for solving complex mathematical problems to approve transactions associated with the distributed register network. Staking nodes of the distributed register network may be responsible for verifying validity of the transactions in the distributed register network using consensus. Light nodes of the distributed register network may be responsible for accommodating faster transactions and daily activities associated with the distributed register network. Major nodes of the distributed register network may be responsible for validating and recording transactions associated with the distributed register network.

Super nodes of the distributed register network may be responsible for performing specialized tasks of the distributed register network.

As shown in block 610, the system extracts metadata from the one or more nodes. The system may establish a secure connection with the one or more nodes of the distributed register network to extract the metadata associated with the one or more nodes. Extracted metadata from the one or more nodes may comprise at least one of Internet Protocol (IP) address, hardware configuration, security vulnerabilities, patches, software, and/or the like. In some embodiments, the system may establish the secure connection, via an application provided by the system of the present invention that is installed on each of the one or more nodes. In some embodiments, the system may determine a type of each of the one or more nodes based on the metadata extracted from the one or more nodes. For example, the system may determine that there are four nodes in a distributed register network, where a first node may be a full node, a second node may be a miner node, a third node may be a major node, and a fourth node may be pruned full node.

As shown in block 620, the system continuously monitors the one or more nodes to detect changes to the one or more nodes. The system may monitor in real-time the one or more nodes to detect any anomalies, where the anomalies may comprise any changes to the one or more nodes at a previous time period. Anomalies may comprise any hardware changes, software changes, network changes, and/or the like.

As shown in block 630, the system parses the metadata and the changes to a deep learning network. In some preferred embodiments of the invention, deep learning network employed by the system may utilize Generative Adversarial Networks (GANs). In some embodiments, the deep learning network employed by the system may utilize any of the algorithms including, but are not limited to, Convolutional Neural Networks (CNNs), Long Short Term Memory Networks (LSTMs), Recurrent Neural Networks (RNNs), Radial Basis Function Networks (RBFNs), Multilayer Perceptrons (MLPs), Self-Organizing Maps (SOMs), Deep Belief Networks (DBNs), Restricted Boltzmann Machines (RBMs), Autoencoders, and/or the like.

As shown in block 640, the system determines, via the deep learning network, anomalies associated with the one or more nodes based on the changes. The deep learning network may continuously receive real-time data associated with the one or more nodes and may continuously analyze the received real-time data to detect anomalies. For example, the system may determine an anomaly as change in hardware based on the metadata and the changes received in block 630 as illustrated in FIG. 7. The deep learning networks continuously analyze and compare data in different instances of time to determine anomalies associated with the one or more nodes.

As shown in block 650, the system determines target metrics and factors associated with the anomalies. Based on detecting the anomalies, the system may map the anomalies to one or more factors that define the change in processing capacity or functioning of the one or more nodes because of the anomaly detected. The system may determine the target metrics that are impacted by the detected anomaly. The system may also calculate factor levels associated with the target metrics and the factors. For example, if the detected anomaly is change in hardware, the change may contribute to a factor which causes delay in providing consensus and the target metric that is impacted because of this is transaction volume. In such an instance, the system calculates that varying the target metrics/factor level in two stages will provide an estimation on performance of the node, where transaction volume is incremented in two levels to identify how the node performs. This example is illustrated in FIG. 7.

As shown in block 660, the system creates simulation test scenarios based on the target metrics, factors, and the anomalies, wherein the simulation test scenarios are associated with a plurality of configurations of the one or more nodes. The system may create simulation test scenarios for all of the target metrics, factors, and factor levels determined by the system to generate a configuration for each mode. For example, if the distributed register network comprises two nodes, where a first node is associated with target metric 'transaction volume' and a second node is associated with target metric 'data hold time,' the system may vary these target metrics in two levels and generate x" configurations (also referred to as simulation test scenarios), where 'x' is the number of nodes and 'n' is the number of levels.

As shown in block 670, the system executes the simulation test scenarios in parallel, via a quantum computer. The system may execute all of the simulation test scenarios at once in parallel. In some embodiments, the quantum computer used may be a photonic quantum computer.

As shown in block 680, the system determines an optimal configuration for the one or more nodes from the plurality of configurations based on executing the simulation test scenarios. In some embodiments, the system may determine the optimal configuration based at least on determining an exposure rating associated with the plurality of configurations. In some embodiments, the system may determine the optimal configuration based at least on determining a stability rating associated with the plurality of configurations.

As shown in block 685, the system routes the optimal configuration to the distributed register network. The system may determine the stable configuration based on at least one of the exposure rating and the stability rating and may route the configuration to the distributed register network. As shown in block 690, the system deploys the optimal configuration to the one or more nodes of the distributed register network. In some embodiments, the system may also control the one or more nodes based on at least one of geo fencing and temporal fencing. For example, the system may determine that a first node of a distributed register network is at a location 'X' and that the location 'X' is vulnerable to security threats due to natural calamities and may deactivate the first node.

FIG. 7 provides a tabular representation of determining anomalies, factors, and metrics associated with one or more nodes of a distributed register network, in accordance with an embodiment of the invention. It should be understood that the example provided in FIG. 7 is for illustrative purposes only and in no way delineates the scope of the invention. As shown, there may be seven nodes (5 active nodes and 2 inactive nodes) in a distributed register with node identifiers represented in column 'Node ID' 705, where each node may be a different type of node as represented in column 'Node Type' 710. The system may continuously monitor the seven nodes and may detect anomalies as shown in column 'Anomaly' 715. The factors impacted by the anomaly are shown in the column 'Factors' 720 and the target metrics impacted by the anomaly are shown in the column 'Target Metrics' 725. The factor levels calculated by the system may comprise two levels for each of the target metric.

FIG. 8 provides a tabular representation of one or more configurations associated with the one or more nodes of the distributed register network, in accordance with an embodiment of the invention. It should be understood that the example provided in FIG. 8 is for illustrative purposes only and in no way delineates the scope of the invention. For this example, four nodes and two target metric levels are considered, which result in 24 configurations as shown in column 'Configuration' 830. Each node is varied by factors in two levels (e.g., '0' or '1') as shown in columns 'Factor 1' 805, 'Factor 2' 810, 'Factor 3' 815, and 'Factor 4' 820. The system may execute/run all these configurations/simulations to determine an optimized configuration based on stability rating shown in column 'Stability Rating' 835 and exposure rating shown in column 'Exposure Rating' 825. In the illustration shown in FIG. 8, the system may determine Configuration 15 as the most optimized configuration based on the exposure rating and the stability rating (e.g., having low exposure rating and the configuration being stable).

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for dynamically analyzing and configuring nodes of a distributed network leveraging photonic quantum computing, the system comprising:

a memory device with computer-readable program code stored thereon;

a communication device; and a processing device operatively coupled to the memory device and the communication device, wherein the processing device is configured to execute the computer-readable program code to:

identify one or more nodes of a distributed register network;

extract metadata from the one or more nodes;

continuously monitor the one or more nodes to detect changes to the one or more nodes;

parse the metadata and the changes to a deep learning network;

determine, via the deep learning network, anomalies associated with the one or more nodes based on the changes;

map the anomalies to target metrics and factors, wherein each anomaly of the anomalies is mapped to one or more corresponding factors, wherein the factors define changes in processing capacity of the one or more nodes caused by the anomalies, wherein the target metrics are impacted by the anomaly;

create simulation test scenarios based on the target metrics, the factors, and the anomalies to generate a plurality of configurations for the one or more nodes, wherein creating the simulation test scenarios comprises varying the factors in at least two levels for each of the target metrics to generate the plurality of configurations for the one or more nodes;

execute the simulation test scenarios in parallel, via a quantum computer; and determine an optimal configuration for the one or more nodes from the plurality of configurations based on executing the simulation test scenarios.

2. The system according to claim 1, wherein the processing device is further configured to execute the computer-readable program code to:

route the optimal configuration to the distributed register network; and deploy the optimal configuration to the one or more nodes of the distributed register network.

3. The system according to claim 1, wherein the processing device is further configured to execute the computer-readable program code to determine the optimal configuration based at least on determining an exposure rating associated with the plurality of configurations.

4. The system according to claim 1, wherein the processing device is further configured to execute the computer-readable program code to determine the optimal configuration based at least on determining a stability rating associated with the plurality of configurations.

5. The system according to claim 1, wherein the processing device is configured to determine type of the one or more nodes based on the metadata extracted from the one or more nodes.

6. The system according to claim 1, wherein the processing device is configured to control the one or more nodes based on at least one of geo fencing and temporal fencing.

7. The system according to claim 1, wherein the quantum computer is a photonic quantum computer.

8. A computer program product dynamically analyzing and configuring nodes of a distributed network leveraging photonic quantum computing, the computer program product comprising at least one non-transitory computer readable medium having computer-readable program code portions embodied therein, the computer-readable program code portions comprising executable portions for:

identifying one or more nodes of a distributed register network;

extracting metadata from the one or more nodes;

continuously monitoring the one or more nodes to detect changes to the one or more nodes;

parsing the metadata and the changes to a deep learning network;

determining, via the deep learning network, anomalies associated with the one or more nodes based on the changes;

mapping the anomalies to target metrics and factors, wherein each anomaly of the anomalies is mapped to one or more corresponding factors, wherein the factors define changes in processing capacity of the one or more nodes caused by the anomalies, wherein the target metrics are impacted by the anomaly;

creating simulation test scenarios based on the target metrics, the factors, and the anomalies to generate a plurality of configurations for the one or more nodes, wherein creating the simulation test scenarios comprises varying the factors in at least two levels for each of the target metrics to generate the plurality of configurations for the one or more nodes;

executing the simulation test scenarios in parallel, via a quantum computer; and determining an optimal configuration for the one or more nodes from the plurality of configurations based on executing the simulation test scenarios.

9. The computer program product of claim 8, wherein the computer-readable program code portions comprising executable portions for:

routing the optimal configuration to the distributed register network; and deploying the optimal configuration to the one or more nodes of the distributed register network.

10. The computer program product of claim 8, wherein the computer-readable program code portions comprising executable portions for determining the optimal configuration based at least on determining an exposure rating associated with the plurality of configurations.

11. The computer program product of claim 8, wherein the computer-readable program code portions comprising executable portions for determining the optimal configuration based at least on determining a stability rating associated with the plurality of configurations.

12. The computer program product of claim 8, wherein the computer-readable program code portions comprising executable portions for determining type of the one or more nodes based on the metadata extracted from the one or more nodes.

13. The computer program product of claim 8, wherein the computer-readable program code portions comprising executable portions for controlling the one or more nodes based on at least one of geo fencing and temporal fencing.

14. A computer-implemented method for dynamically analyzing and configuring nodes of a distributed network leveraging photonic quantum computing, the method comprising:

identifying one or more nodes of a distributed register network;

extracting metadata from the one or more nodes;

continuously monitoring the one or more nodes to detect changes to the one or more nodes;

parsing the metadata and the changes to a deep learning network;

determining, via the deep learning network, anomalies associated with the one or more nodes based on the changes;

mapping the anomalies to target metrics and factors, wherein each anomaly of the anomalies is mapped to one or more corresponding factors, wherein the factors define changes in processing capacity of the one or more nodes caused by the anomalies, wherein the target metrics are impacted by the anomaly;

creating simulation test scenarios based on the target metrics, the factors, and the anomalies to generate a plurality of configurations for the one or more nodes, wherein creating the simulation test scenarios comprises varying the factors in at least two levels for each of the target metrics to generate the plurality of configurations for the one or more nodes;

executing the simulation test scenarios in parallel, via a quantum computer; and determining an optimal configuration for the one or more nodes from the plurality of configurations based on executing the simulation test scenarios.

15. The computer-implemented method of claim 14, wherein the method further comprises:

routing the optimal configuration to the distributed register network; and deploying the optimal configuration to the one or more nodes of the distributed register network.

16. The computer-implemented method of claim 14, wherein the method comprises determining the optimal configuration based at least on determining an exposure rating associated with the plurality of configurations.

17. The computer-implemented method of claim 14, wherein the method comprises determining the optimal configuration based at least on determining a stability rating associated with the plurality of configurations.

18. The computer-implemented method of claim 14, wherein the method comprises determining type of the one or more nodes based on the metadata extracted from the one or more nodes.

19. The computer-implemented method of claim 14, wherein the method comprises controlling the one or more nodes based on at least one of geo fencing and temporal fencing.

20. The computer-implemented method of claim 14, wherein the quantum computer is a photonic quantum computer.

* * * * *